United States Patent [19]

Eisman

[11] 4,380,301
[45] Apr. 19, 1983

[54] STAKED REINFORCED STRIPS

[75] Inventor: Norman L. Eisman, Columbus, Ind.

[73] Assignee: Arvin Industries, Inc., Columbus, Ind.

[21] Appl. No.: 219,978

[22] Filed: Dec. 24, 1980

[51] Int. Cl.³ .......................... B65D 6/36; F16N 31/00
[52] U.S. Cl. ........................................ 220/73; 184/106
[58] Field of Search ............... 220/73, 85 K, 309, 310, 220/75, 76, 77; 403/393; 113/120 V; 184/106

[56] References Cited

U.S. PATENT DOCUMENTS

| | | | |
|---|---|---|---|
| 1,297,419 | 3/1919 | Thackray | 113/120 V |
| 1,307,711 | 6/1919 | Tower | 220/73 X |
| 1,474,645 | 11/1923 | Schilling | 220/73 |
| 1,773,278 | 8/1930 | Reid | 220/73 |
| 1,864,313 | 6/1932 | Monson | 220/75 X |
| 1,910,426 | 5/1933 | Courtright | 220/73 X |
| 1,961,121 | 5/1934 | Knapp. | |
| 2,241,781 | 5/1941 | Jackson | 220/73 |
| 2,568,518 | 9/1951 | Smith | 220/73 |
| 2,598,962 | 6/1952 | Anseele | 220/73 X |
| 2,605,929 | 8/1952 | Bloomfield | 220/73 |
| 2,764,136 | 9/1956 | Gadd | 220/73 X |
| 2,887,242 | 5/1959 | Grau | 220/309 X |
| 2,987,226 | 6/1961 | Bane | 220/293 X |
| 3,581,814 | 6/1971 | Jackson | 220/73 X |
| 3,622,037 | 11/1971 | Gildart | 220/73 |

FOREIGN PATENT DOCUMENTS 380055 9/1932 United Kingdom ................. 220/73

Primary Examiner—Allan N. Shoap
Attorney, Agent, or Firm—Barnes & Thornburg

[57] ABSTRACT

A mechanical connection for securing a reinforcing strip to a flange on a deep-drawn receptacle, such as an oil pan, includes a tab formed on the outer edge of the flange, and opposed notches formed on edges of the reinforcing strip. The notches are aligned with the tab, and the tab and a segment of the side wall of the receptacle are staked into engagement with the notches to secure the strip to the flange.

15 Claims, 6 Drawing Figures

STAKED REINFORCED STRIPS

This invention relates to methods for reinforcing the flange of deep-drawn parts such as oil pans and, more particularly, to a method of staking a reinforcing strip onto the flange of an oil pan to strengthen the flange and prevent fluid leakage.

Various methods have been employed to reinforce the flange of deep-drawn receptacles such as oil pans. One of the reasons for reinforcing the flange is for damping vibrations of the oil pan. Because oil pans are usually formed from relatively thin metal, engine vibrations cause them to vibrate noisily, thus annoying those within earshot of the engine. Another reason for reinforcing the flange is to provide a better seal at the flange, and thus prevent fluid leakage around the flange sealing surface. This leakage problem is most pronounced in the area between the bolt holes. Absent a reinforcing strip, the thin metal in the oil pan flange tends to buckle in this area when the bolts are tightened.

The standard industry practice for reinforcing the flanges is to spot-weld a reinforcing strip onto the flange. There are several problems associated with spot-welded reinforcing strips. Spot-welding can cause distortion and blemishing of the flange, which ultimately results in fluid leakage around the flange sealing surface. The spot-welding process is also relatively time-consuming, and many times causes bottlenecks in the production process.

It is therefore an object of this invention to provide a method for reinforcing a flange on a deep-drawn part such as an oil pan which serves to be more effective in preventing fluid leakage around the flange than methods presently employed.

It is another object of this invention to provide a method for securing a reinforcing strip to the flange which does not employ spot-welding.

It is a further object of this invention to prevent leakage of fluid through the flange of a deep-drawn part such as an oil pan caused by distortion and blemishes in the flange.

It is also an object of this invention to provide a process for securing a reinforcing strip to a deep-drawn part which will be less time-consuming than those methods presently employed.

According to the present invention, deep-drawn parts such as oil pans are fabricated containing a bottom, sides, and a flange extending substantially at right angles from the top edges of the sides of the deep-drawn part. This flange normally includes a plurality of bolt holes through which bolts pass for mounting the part to a crankcase or analogous structures. A plurality of tabs are formed during a flange-trimming process which project outward on the outer edge of the flange. Reinforcing strips are fabricated with a plurality of larger notches along the outside edges, spaced to be interengageable with the tabs, and a plurality of smaller notches on the opposite or inside edge of the reinforcing strip, each smaller inside notch being spaced to be directly opposite to a larger outside notch. The reinforcing strip further includes apertures spaced so as to be aligned with the bolt holes in the flange. The tabs and the peripheral edge of the flange are then formed so that it and the tabs are substantially parallel with the sides of the oil pan, and substantially perpendicular to the flange. The reinforcing strip is then placed flush against the bottom surface of the flange with the apertures of the strip aligned with the bolt holes of the flange. Next, the assembled deep-drawn part and reinforcing strip are staked together by the simultaneous action of dual cams in which one cam forms an embossment in the side of the pan to engage the small or inside notches on the reinforcing strip and the other cam bends the opposing tab to engage the opposing larger outside notch on the reinforcing strip.

The invention will best be understood by reference to the appended drawings forming a part of this specification and which illustrate a preferred embodiment thereof, wherein.

Figure 1:
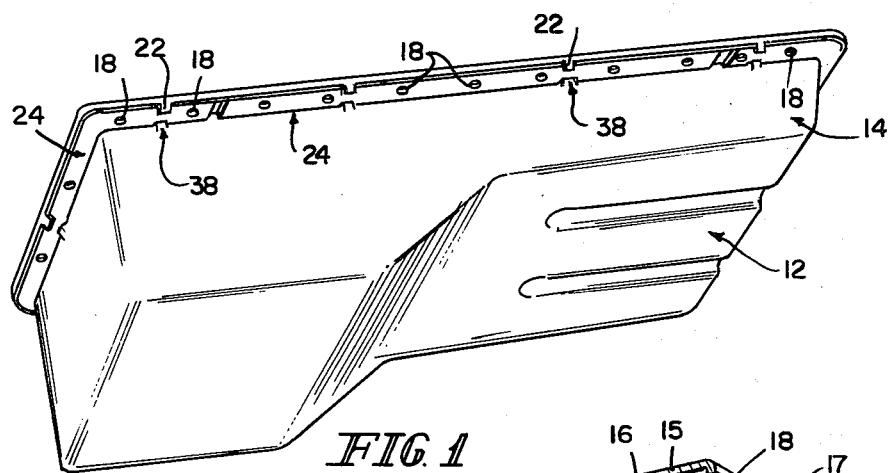
FIG. 1 is a perspective view of a deep-drawn part such as an oil pan embodying the invention.
Figure 2:
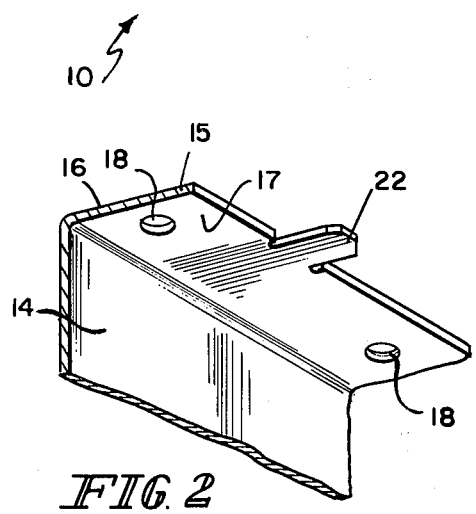
FIG. 2 is an enlarged fragmentary view of the side and flange of an oil pan before a skirting operation.
Figure 3:
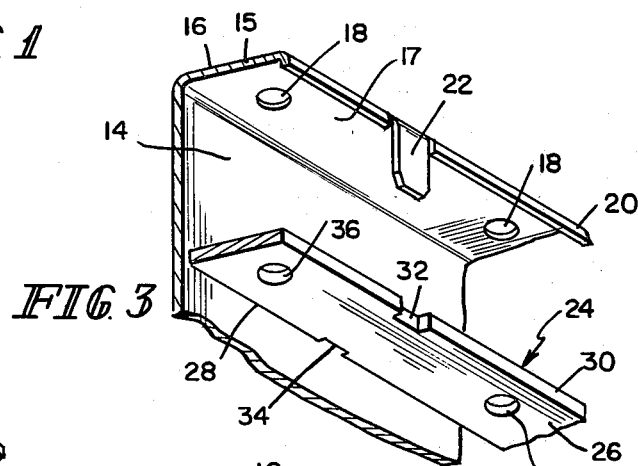
FIG. 3 is an enlarged fragmentary view of the side and flange of an oil pan and a reinforcing strip after the skirting operation and before the staking operation.
Figure 4:
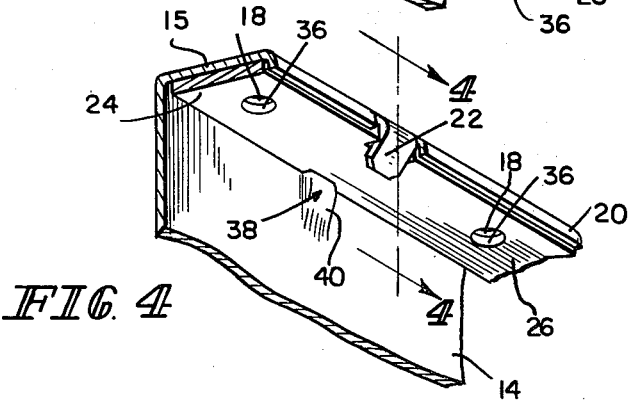
FIG. 4 is an enlarged fragmentary view of the side and flange of an oil pan and a reinforcing strip after the staking operation.

Referring now to FIGS. 1–4, a deep-drawn receptacle such as an oil pan 10 includes a bottom 12, sides 14, and a flange 15. The flange 15 includes a top or sealing surface 16, and a bottom surface 17, and extends outwardly generally perpendicular from the top of the sides 14 of the pan 10. The flange 15 includes bolt holes 18 through which pass mounting bolts (not shown) for securing the pan 10 to a crankcase (not shown) or an analogous structure. Formed at the outer edge of the flange 15 is a skirt 20 extending substantially perpendicularly downward therefrom and a plurality of tabs 22. The number, spacing, size, and shape of the tabs 22 are variable to conform with piece part requirements, use of product, and customer preference.

Mounted flush to the bottom surface 17 of the flange 15 is a reinforcing strip 24 containing a flat portion 26, an inside edge 28, and an outside edge 30. In the preferred embodiment, the reinforcing strip 24 is of the non-continuous type, although a continuous type can also be used. The outside edge 30 contains a plurality of notches 32 spaced so as to be engageable with the tabs 22. The inside edge 28 of the reinforcing strip 24 contains a plurality of notches 24, spaced so as to be directly opposite the notches 32. In the preferred embodiment, the notches 32, 34 are rectangular, although they, like the tabs 22, can be of variable shape and size. Also, in the preferred embodiment, notches 34 are smaller than the notches 32.

The flat portion 26 of the reinforcing strip 24 includes a plurality of apertures 36 spaced and sized to align with the bolt holes 18 on the flange 15. The reinforcing strip 24 is secured to the flange 15 by the engagement of embossments 38 staked in segments of the side 14 of the oil pan 10 with the notches 34 on the inside edge 28 of the reinforcing strip 24, and by the engagement of the tabs 22 with the notches 32 on the outside edge 30 of the reinforcing strip 24.

Figure 5:
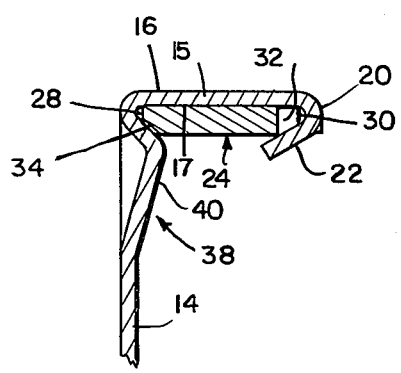
FIG. 5 is a sectional view taken along lines 4—4 of FIG. 4 illustrating a tapered embossment.

FIG. 5 is an illustration of the invention which embodies a tapered embossment 40.

Figure 6:
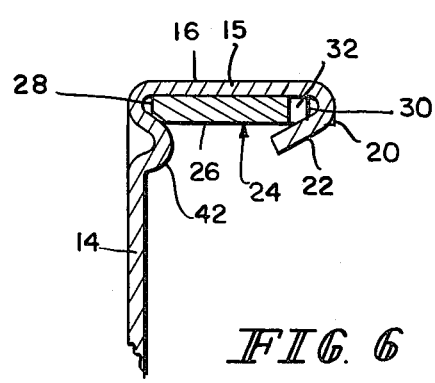
FIG. 6 is a sectional view similar to FIG. 5 and illustrating a spherical dimple embossment.

FIG. 6 is an illustration of the invention which embodies a spherical dimple embossment 42.

The invention is made according to the following process. The oil pan 10 is fabricated with a relatively large outwardly extending flange 15. The periphery of the flange 15 is then trimmed. During the trimming process, outwardly projecting tabs 22 are formed on the outer edge of the flange 15.

The reinforcing strips 24 are fabricated with a plurality of notches 32 on the outside edge 30, and a plurality of notches 34 on the inside edge 28 diametrically opposed to the notches 32. The outer edge of the flange 15 is then formed so that it and the tabs 22 extend downwardly substantially perpendicular to the plane of the flange 15, and substantially parallel to the side 14 of the oil pan 10. The reinforcing strip 24 is then supported flush against the bottom surface 17 of the flange 15, with the apertures 36 of the reinforcing strip 24 being aligned with the bolt holes 18 in the flange 15. Next, the oil pan 10 and the reinforcing strip 24 are joined together by the simultaneous action of dual cams (not shown) in which one of the cams stakes embossments 38 in the side 14 of the oil pan 10 to engage with the notches 34, and the other cam stakes the opposing tabs 22 to engage with the opposing notches 32 on the reinforcing strip 24. It should be noted that the opposed cams may be either mechanically or hydraulically operated.

According to the present invention, the strips 24 may also be secured to the flange 15 without staking the side wall 14 of the receptacle 12 and further without the notches 32, 34 in the strips 24. In one illustrative embodiment, notches 32 may be formed on the outer edges 30 of the strips 24, but not on the inner edges 28, and the tabs 22 are staked into engagement with the notches 32 to secure the strips 24 to the flange 15. In another illustrative embodiment, the tabs 22 may be elongated and no notches formed in the strips 24. The elongated tabs 22 are staked into engagement with the strips 24 to secure the strips 24 to the flange 15. In each of these embodiments, the strips 24 are positioned adjacent the flange 15 between the side wall 14 and the skirt 20 depending from the outer edge of the flange 15.

While the invention has been described by reference to certain preferred embodiments thereof and certain parts have been named with relative specificity, it is to be understood that the scope of the invention and claims should not be restricted thereto, and that the invention includes all embodiments thereof which would be apparent to one skilled in the art, and which therefore come within the spirit and scope of the invention.

What is claimed is:

1. In an oil pan having a side wall, a flange extending outwardly from the side wall for mounting the pan, a reinforcing strip on the flange, and a mechanical connection for securing the reinforcing strip to the flange, the mechanical connection comprising a tab formed in the outer edge of the flange, opposed notches formed in the outer edges of the reinforcing strip and aligned with the tab, and a staked segment of the side wall adjacent the strip engaging one of the notches, the tab also being staked, and engaging the other notch to secure the strip to the flange.

2. The mechanical connection of claim 1 wherein the staked segment of the side wall comprises a tapered embossment.

3. The mechanical connection of claim 1 wherein the staked segment of the side wall comprises a spherically dimpled embossment.

4. The mechanical connection of claim 1 wherein the opposed notches are substantially rectangular.

5. The mechanical connection of claims 1 or 4, further comprising bolt holes in the flange and apertures in the reinforcing strip, said bolt holes being spaced and sized to align with corresponding apertures in the reinforcing strips.

6. In an oil pan having side walls terminating in an outwardly extending perimetral flange with an outer edge for mounting the pan and a reinforcing strip engaging the flange, the improvement comprising a mechanical connection for securing the reinforcing strip to the flange which includes at least one tab provided on the outer edge of the flange and wherein the reinforcing strip includes diametrically opposed notches aligned with the tab, the tab and a segment of the side wall of the receptacle adjacent the notches being staked into engagement with the notches to connect the strip to the flange.

7. The improvement of claim 6 wherein the staked segment of the side wall comprises a tapered embossment.

8. The improvement of claim 6 wherein the staked segment of the side wall comprises a spherically dimpled embossment.

9. The improvement of claim 6, further comprising bolt holes in the flange and apertures in the reinforcing ring, said bolt holes being spaced and sized to align with corresponding apertures in the reinforcing strips.

10. In an oil pan having a side wall, a flange extending outwardly from the side wall for mounting the pan, the flange having a substantially flat, upper planar sealing surface and a substantially flat, lower planar surface opposed to the sealing surface, a reinforcing strip on the surface opposed to the sealing surface, and a mechanical connection for securing the reinforcing strip to the flange, the mechanical connection comprising a tab formed on the outer edge of the flange, and a notch formed in the outer edge of the reinforcing strip and aligned with the tab, the notch defining an opening through the strip, the tab being staked and engaging the notch to secure the strip to the flange.

11. The mechanical connection of the claim 10, further comprising a notch formed on the inner edge of the reinforcing strip in opposition to the notch on the outer edge and a staked segment of the side wall adjacent the strip engaging the notch on the inner edge of the strip.

12. In an oil pan having a side wall, a flange extending outwardly from the side wall for mounting the pan, a reinforcing strip on the flange, and a mechanical connection for securing the reinforcing strip to the flange, the mechanical connection comprising a tab formed on the outer edge of the flange, a notch formed in the outer edge of the reinforcing strip, the tab being staked and engaging the notch in the outer edge of the strip, and a staked segment of the side wall engaging an inner edge of the strip to secure the strip to the flange.

13. The mechanical connection of claim 12, further comprising opposed notches formed in the outer and inner edges of the reinforcing strip and aligned with the tab, the staked tab engaging the notch in the outer edge of the strip and the staked segment engaging the notch in the inner edge of the strip.

14. In an oil pan having a side wall, a flange extending outwardly from the side wall for mounting the pan, the flange having a substantially flat, upper planar sealing surface and a substantially flat, lower planar surface opposed to the sealing surface, a reinforcing strip on the surface opposed to the sealing surface and having substantially flat upper and lower planar surfaces, and a mechanical connection for securing the reinforcing strip to the flange, the mechanical connection comprising a skirt formed on the outer edge of the flange at generally a right angle thereto, a tab formed on the outer edge of the flange, and a notch formed in the outer edge of the reinforcing strip defining an opening therethrough from the upper surface to the lower surface of the strip, the strip being positioned adjacent the flange between the side wall and the skirt and the tab being staked inwardly into engagement with the notch in the strip to secure the strip to the flange.

15. In an oil pan having a side wall, a flange extending outwardly from the side wall for mounting the pan, the flange having a substantially flat, upper planar sealing surface and a substantially flat, lower planar surface opposed to the sealing surface reinforcing means on the flange, and a mechanical connection for securing the reinforcing means to the flange, the improvement wherein the reinforcing means includes a plurality of reinforcing strips on the flange surface opposed to the sealing surface, each strip having substantially flat upper and lower planar surfaces and the mechanical connection includes tabs formed on the outer edge of the flange and at least one notch formed in the outer edge of each strip and aligned with a tab, each notch defining an opening through the strip from the upper surface to the lower surface thereof, each tab being staked and engaging a notch to individually secure the strips to the flange.

* * * * *